United States Patent [19]
Klinger

[11] Patent Number: 4,538,257
[45] Date of Patent: Aug. 27, 1985

[54] ADAPTIVELY STABILIZED RECORDING FOR DIRECT READ AFTER WRITE OPTICAL MEMORIES

[75] Inventor: Lance T. Klinger, Mt. View, Calif.

[73] Assignee: Xerox Corporation, Stamford, Conn.

[21] Appl. No.: 452,657

[22] Filed: Dec. 23, 1982

[51] Int. Cl.³ .................... G11B 7/00; G01D 15/14
[52] U.S. Cl. ................... 369/106; 369/107; 369/116; 346/76 L
[58] Field of Search ............... 369/53, 106, 107, 116, 369/50; 346/76 L

[56] References Cited

U.S. PATENT DOCUMENTS

| | | | |
|---|---|---|---|
| 3,995,264 | 11/1976 | Ouchi | 340/146.1 AB |
| 4,027,335 | 5/1977 | Miller | 360/40 |
| 4,063,287 | 12/1977 | van Rosmalen | 358/128 |
| 4,093,961 | 6/1978 | Kanamaru | 358/128 |
| 4,162,398 | 7/1979 | Kayanuma | 250/205 |
| 4,380,015 | 4/1983 | Ito et al. | 369/106 X |

FOREIGN PATENT DOCUMENTS

| | | |
|---|---|---|
| 2033132 | 5/1980 | European Pat. Off. |
| 0028111 | 6/1981 | European Pat. Off. |
| 0044072 | 1/1982 | European Pat. Off. |
| 0087174 | 8/1983 | European Pat. Off. |

OTHER PUBLICATIONS

Norris, Kermit and Bloomberg, Dan S, "Channel Capacity of Charge-Constrained Run-Length Limited Codes"—IEEE Transactions on Magnetics, vol. Mag. 17, No. 6, Nov. 1981, pp. 3452-3455.

*Primary Examiner*—Robert L. Richardson

[57] ABSTRACT

To desensitize the write channel of a direct read after write optical memory from time dependent changes in the operating characteristics of the hardware and from time and position dependent variations in the performance characteristics of the recording medium, the present invention provides a real time feedback system for adjusting the output power of the write laser or similar source and/or for adjusting the modulation timing of the write beam so as to null out any unwanted dc component that is exhibited by the recorded data during the direct read after write process. In other words, the feedback stabilizes the timing of the transitions in the recorded data.

6 Claims, 5 Drawing Figures

ADAPTIVELY STABILIZED RECORDING FOR DIRECT READ AFTER WRITE OPTICAL MEMORIES

FIELD OF THE INVENTION

This invention relates to optical memories, such as write once and eraseable optical disk memories. More particularly, it pertains to adaptively stabilized data writing or recording methods and means for direct read after write optical memories.

BACKGROUND OF THE INVENTION

Substantial effort and expense have been devoted to the development of optical memories, primarily in an attempt to improve the storage capacity-to-physical size relationship of random access mass data storage systems. A significant portion of this work has been directed toward so-called direct read after write optical memories because they are compatible with relatively straightforward error direction and correction techniques.

Optical disk memories are attractive for mass data storage applications because they offer relatively high data packing densities. However, this advantage is reduced, or even nullified, if there is an unacceptably high data error rate. As will be appreciated, more or less conventional error correction techniques may be employed to correct for random isolated errors and for relatively short burst errors. Accordingly, an unacceptably high data error rate is normally associated with longer burst errors, such as may be caused by a defect in the recording medium or by drift in the timing of the data recording process. Of course, it is essential to limit the data error rate to an acceptably low level because otherwise the record (i.e., the recorded data) may be useless.

Direct read after write memories have the advantage that the recorded data can be directly verified. If the verification process indicates that the data error rate is running at an unacceptably high level, the data can be re-recorded, typically on another sector of the recording medium. That usually is an acceptable solution to the problem if the elevated error rate is attributable to, say a localized defect in the recording medium. However, it is of little, if any, assistance if the increased error rate is caused by a loss of timing in the data writing process. A well designed system generally has some margin for such timing errors, but there still is the risk that changes in the operating characteristics of the system will produce timing errors which exceed those margins.

Others have addressed some of the problems that may occur in optical memories due to time dependent changes in their operating characteristics. For example, U.S. Pat. No. 4,093,961 on "Optical Reading Apparatus with Scanner Light Intensity Control" relates to a feedback system for adjusting the output power of a laser in order to maintain a substantially constant average optical intensity level at a data detecting/tracking photodetector. Unfortunately, such read or sensor channel compensation techniques cannot correct for errors caused by drift or other variations in the data recording parameters. Somewhat more to point, it has been suggested that the write channel performance should be periodically adjusted, say, once per sector, as necessary to cause a recorded test pattern to conform to a predetermined profile. However, that is a relatively slow process which only partially compensates for time dependent changes in the operating characteristics of the write channel.

SUMMARY OF THE INVENTION

To desensitize the write channel of a direct read after write optical memory from time dependent changes in the operating characteristics of the hardware and from time and position dependent variations in the performance characteristics of the recording medium, the present invention provides a real time feedback system for adjusting the output power of the write laser or similar source and/or for adjusting the modulation timing of the write beam so as to null out any unwanted dc component that is exhibited by the recorded data during the direct read after write process. In other words, the feedback stabilizes the timing of the data recording process.

A particularly attractive implementation of the invention is based on using a dc free code for the recorded data. The principal advantages of that approach are that the feedback system may be ac coupled and may rely upon baseline discrimination of the recorded data transitions since the set point value or null point for the feedback system is zero. More particularly, as a result of the ac coupling and the baseline discrimination, the feedback system is essentially immune to spurious influences, such as read channel and/or sensor channel performance variations which have no affect on the timing of the data recording process.

BRIEF DESCRIPTION OF THE DRAWINGS

Still further advantages and features of the present invention will become apparent when the following detailed description is read in conjunction with the attached drawings, in which.

DETAILED DESCRIPTION OF THE ILLUSTRATED EMBODIMENT

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
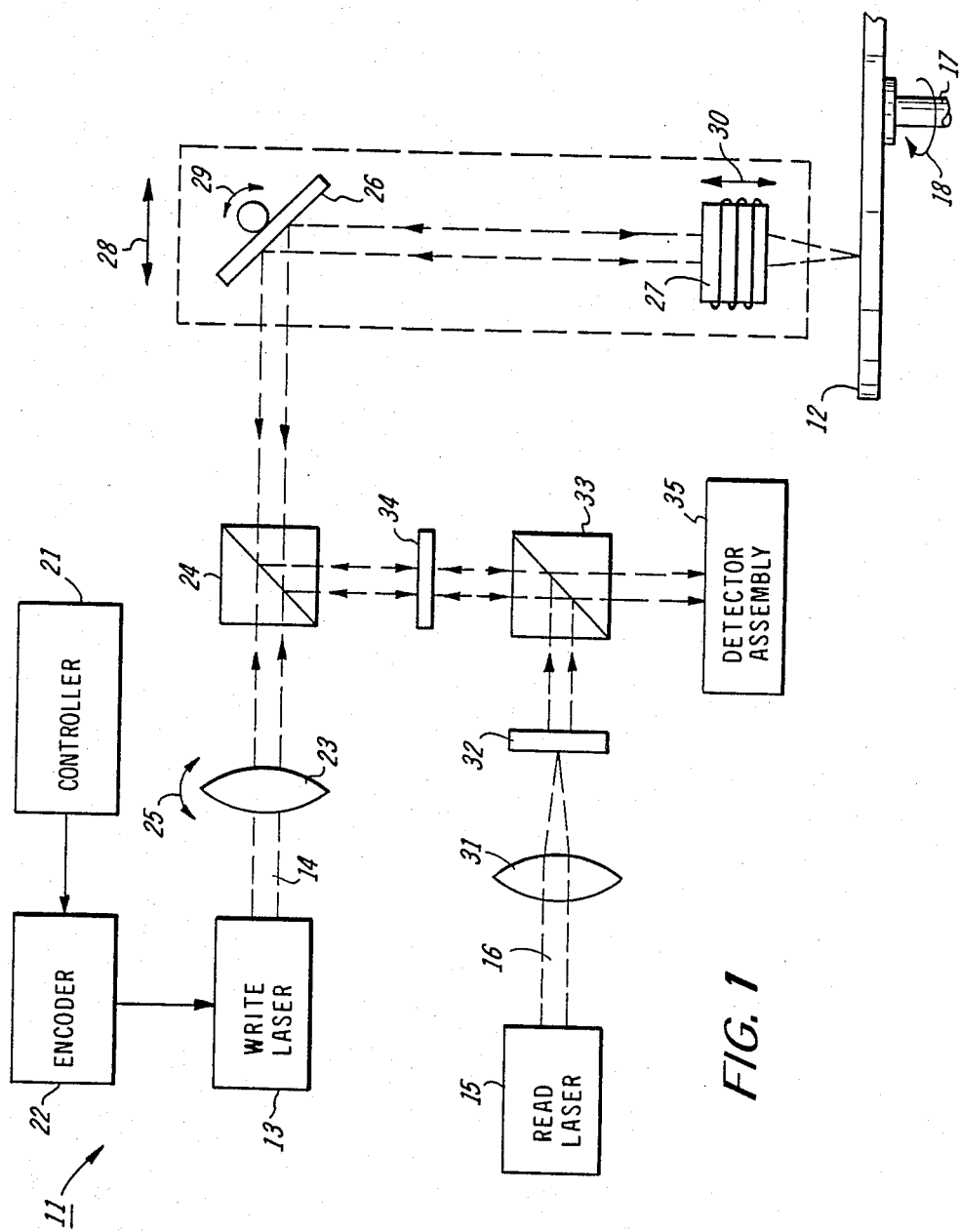
FIG. 1 is a simplified schematic diagram of a more or less conventional direct read after write optical disk memory system.

Turning now to the drawings, and at this point especially to FIG. 1, there is a direct read after wire optical memory 11 (shown only in relevant part) for writing data on and retrieving data from an optical recording medium 12. In view of the current state of the art, the memory 11 is illustrated as being a more or less conventional write once optical memory having a removeable, optically ablatable or deformable, disk-like recording medium 12. Nevertheless, it will be evident the present invention may also be applied to eraseable optical memories.

In keeping with accepted practices, the memory 11 includes a write laser 13 for supplying a relatively high power write beam 14 and a read laser 15 for supplying a relatively low power read beam 16. A dual beam integrated laser array (not shown) could be used to more fully integrate the write and rear functions of the memory 11. However, given existing laser technology, the more conservative approach is to employ discrete write and read lasers 13 and 15, respectively.

When the memory 11 is operating in a data recording mode, the write beam 14 is intensity modulated in accordance with the data which is to be recorded and is focused on the disk 12 to write the data thereon. Under all other operating conditions, the write beam 14 is extinquished or at least isolated from the disk 12 because it might otherwise damage the record. The read beam 16, on the other hand, is a more or less constant intensity, continuous wave (cw) light beam which is focused on the disk 12, not only while the memory 11 is operating in a read only mode, but also while it is operating in a recording mode. Some designers specify different wavelengths for the write beam 14 and the read beam 16 to simplify the optical isolation of the write and read channels as described hereinbelow, but that is not an essential feature of direct read after write optical memories in general.

Briefly reviewing the more or less standard features of the memory 11 in some additional detail, it will be seen that the disk 12 is secured to a spindle 17 for rotation at a predetermined speed in the direction of the arrow 18 so that the write beam 14 and/or the read beam 16 advance along a preselected data track at a substantially constant rate. As a general rule, the recording disk 12 for a write once optical memory is relatively flat and has a highly reflective surface finish which is locally perturbed (by, say, abalation or deformation) under the control of the write beam 14 to represent the recorded data.

To write or record data on the disk 12, a controller 21 feeds binary digital data to an encoder 22 which, in turn, supplies an encoded data stream for serially modulating the intensity of the write beam 14. To carry out the present invention, the data is encoded in accordance with a self clocking, dc free code or any other code having a predetermined, fixed, cumulative dc content. Thus, for a more comprehensive description of such codes and encoders for generating them, it may be helpful to refer to U.S. Pat. No. 3,995,264, which issued Nov. 30, 1976 on "Apparatus for Encoding and Decoding Binary Data in a Modified Zero Modulation Data Code"; U.S. Pat. No. 4,027,335, which issued May 31, 1977 on "DC Free Encoding for Data Transmission System"; and Norris, K. and Bloomberg, D. S., "Channel Capacity of Charge-Constrained Run-Length Limited Codes," *IEEE Transactions on Magnetics*, Vol. Mag-17, No. 6, November 1981, pp. 3452–3455.

As shown, the encoded data may modulate the drive current for the write laser 13, thereby directly modulating the write beam 14. To accomplish that, the encoded data typically controls a switch 19 which is connected between the laser 13 and its drive current source 20. While direct modulation is preferred, especially if the write laser 13 is a diode laser, a possible alternative is to employ an acousto-optic or electro-optic modulator (not shown) to intensity modulate the write beam 14 in accordance with the encoded data.

Figure 2:
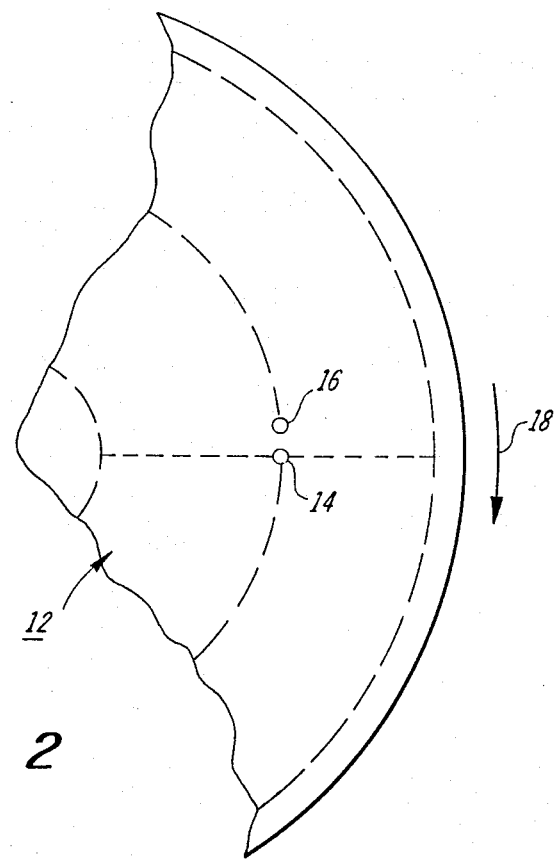
FIG. 2 schematically illustrates the spatial relationship of the write and read beams at the recording medium in a typical direct read after write optical memory.

Adjustable beam steering optics, indicated generally at 23, are generally included in the write channel for applying the intensity modulated write beam 14 to a dichroic beam splitter 24. The beam steering optics 23 are adjusted, as indicated by the arrow 25, to align the write beam 14 with the read beam 16. The beam splitter 24, in turn, directs the aligned beams 14 and 16 to the disk 12 via a reflective galvanometer 26 and a focusing lens 27. Customarily, as shown in FIG. 2, while data is being recorded, the write beam 14 and the read beam 16 are spatially separated at the disk 12 by only a few microns and are aligned so that the read beam 16 faithfully follows the path of the write beam 14 to read the recorded data immediately after it is written (i.e., to perform a "direct read after write").

There usually is an actuator (not shown) for translating the galvanometer 26 and the focusing lens 27 radially relative to the disk 12, as indicated by the arrow 28, so that the write beam 14 and the read beam 16 fall on or near a selected data track. To make the finer adjustments and the minor dynamic adjustments that may be necessary to precisely position and maintain the beams 14 and 16 on the selected track, the galvanometer 26 typically is rotated, as indicated by the arrow 29, under the control of a suitable servo system (also not shown). Furthermore, to hold the write and read beams 14 and 16 in focus on the selected data track, the focusing lens 27 conventionally is a voice coil driven objective or the like which is moved toward and away from the disk 12, as indicated by the arrow 30, under the control of a another servo system (not shown).

Referring to the read channel of the memory 11, it will be seen that there is a lens 31 for focusing the read beam 16 onto a holographic diffraction gating 32, thereby producing outrigger beams for the above mentioned focus and tracking servo control systems. Inasmuch as the present invention does not depend on the details of those servo systems, the outrigger beams have been ignored in the interest of simplifying this disclosure. However, should a more detailed description of the operation of the diffraction grating 32 and its potential advantages be desired, reference may be had to a commonly assigned Curry et al. U.S. Pat. No. 4,283,777, which issued Aug. 11, 1981 on a "Optical Memory Having a Parallel Readout," and to a commonly assigned Bates et al. U.S. Pat. No. 4,290,122, which issued Sept. 15, 1981 on a "Self-Synchronizing Clock Source for Optical Memories." Thus, it need only be noted that the read beam 16 reflects from a polarized beam splitter 33 and passes through a quarter wave length plate 34 while enroute to the dichroic beam splitter 24. The functions of those elements are more fully explained hereinbelow.

To read data from the disk 12, whether for a direct read after write while the memory 11 is operating in a recording mode or for data retrieval purposes while the memory 11 is operating in a read only mode, any light which is specularly reflected from the disk 12 returns through the focusing lens 27 and reflects from the galvanometer 26 to the dichroic beam splitter 24. Even when the memory 11 is operating in a recording mode, the specularly reflected light which reaches the detector 35 (as described herebelow) is primarily from the read beam 16 because the write beam 14 is not imaged thereon. Therefore, the reflected or returned light at the detector 35 is intensity modulated in accordance with the recorded data.

More particularly, in this embodiment, the write beam 14 and the read beam 16 are selected to have different wavelengths. In addition, the dichroic beam splitter 24 is designed to be transmissive to light at the wavelength of the write beam 14 and reflective to light at the wavelength of the read beam 16. Consequently, the beam splitter 24 suppresses unwanted optical feedback to the write laser 13 while causing the specularly reflected light from the beam 16 to pass through the quarter wavelength plate 34 to the polarized beam splitter 33. The quarter wavelength plate 34 is, in turn, selected to shift the phase of the read beam 16 by approximately 90° on each pass therethrough, thereby causing the reflected light from the disk 12 and the incident light from the read laser 15 to be oppositely polarized at the polarized beam splitter 33. Thus, the beam splitter 33 suppresses unwanted optical feedback to the read laser 15 while transmitting the reflected light to a more or less conventional detector assembly 35 for recovery of the encoded data (customarily, together with the usual focus and tracking information).

Figure 3:
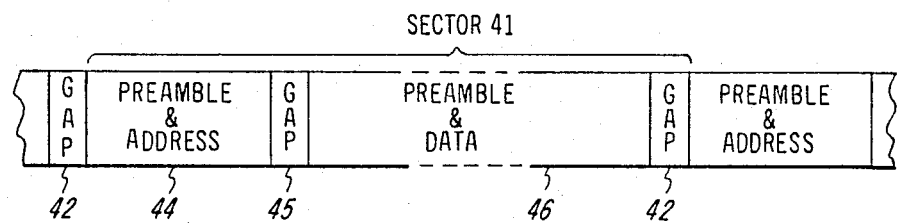
FIG. 3 schematically illustrates a more or less conventional sectored format for an optical recording medium.

Referring to FIG. 3, data conventionally is recorded on the disk 12 in what is known as a sectored format. That is, each data track is divided into a number of sectors 41 (only one complete sector is shown) which are separated from one another by gaps 42. Furthermore, each of the sectors 41 usually has an address or identification field 44 which is followed by a gap 45 and then by a data field 46. Up to several hundred bits of information may be recorded in the address field 44 to facilitate unambiguous access to a given track and sector upon command. The data field 46, on the other hand, generally can accomodate several thousand bits of data and associated information, such as error correction code. Typically, the address and data fields 44 and 46, respectively, are written at separate points in time and include preambles contaninining timing bits which provide a timing reference for, say, a phase locked loop-type data separator (not shown).

Figure 4:
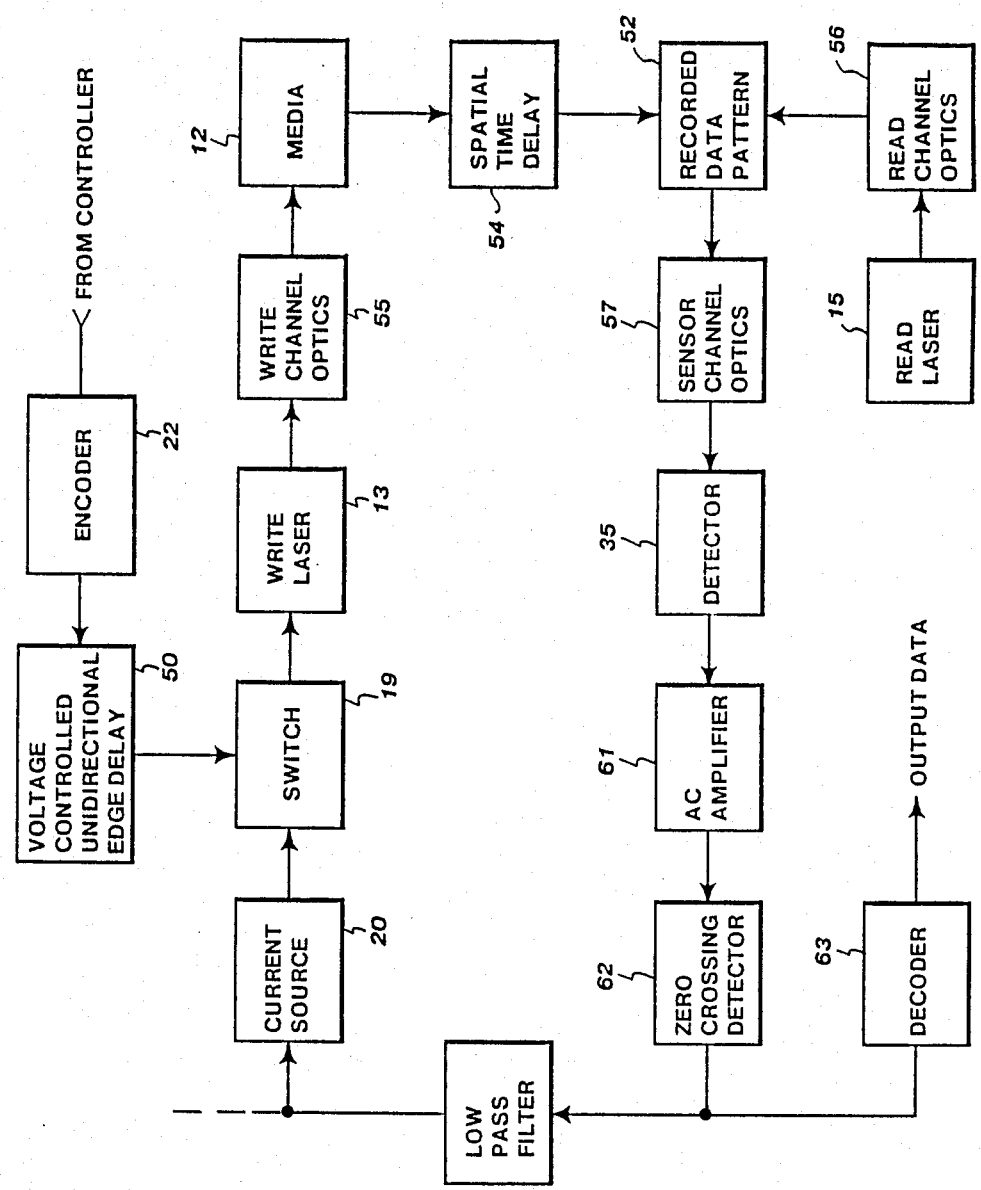
FIG. 4 is a functional block diagram of the feedback system of the present invention as embodied in the optical memory of FIG. 1 to adaptively stabilize the data recording process (an alternative or supplemental stabilization technique is illustrated in dashed lines)

In accordance with the present invention, as shown in FIG. 4, an error signal representing the deviation of the average dc level of the recorded data from a predetermined set point value is continuously fed back to the current source 20 for the write laser 13 and/or to a unidirectional edge delay circuit 50 for the encoder 22 to adjust the intensity and/or duration of the write pulses, thereby nulling out any such deviation. The delay circuit 50 advances or retards the timing of, say, the positive going transitions in the encoded data in dependence on the sense and magnitude of the error signal so as to adjust the effective "on-time" of the write beam. As will be recalled, the data is recorded using a code which has a predetermined average dc content, such as a dc free code. Hence, it will be understood that the feedback effectively compensates for time dependent variations in the performance characteristics of the optical memory system 11 and/or its recording media 12.

More particularly, in keeping with this invention, the feedback controls the data recording process so that the timing of the retrieved data is stabilized. To that end, it not only adaptively compensates for time dependent variations in the performance characteristics of (a) the write control of the memory 11 and (b) the recording medium 12, but also rejects spurious influences which do not affect the timing of the retrieved data, such as changes in the performance characteristics of the read channel and/or sensor channel. As a matter of definition, the write channel of the memory 11 consists of those components which are responsible for producing a recorded data pattern 52 on the recording medium 12 in response to a raw data stream from the controller 21 (FIG. 1). While it is not necessary to draw a fine line between the read channel and the sensor channel to understand this invention, a reasonable functional distinction can be made by defining the read channel as consisting of those components which are responsible for converting the recorded data pattern 52 into a corresponding optical signal and by defining the sensor channel as consisting of those components which are responsible for converting that optical signal into a corresponding electrical signal. With these definitions in mind, it will be understood that the spatial time delay 54 of FIG. 4 represents the short period of time which elapses between the recording and reading of the data pattern 52 when the memory 11 is performing a direct read after write. Additionally, it will be seen that FIG. 4 has been simplified by collectively representing that the write channel optics, the read channel optics, and the sensor channel optics by 55-57, respectively, even though those channels share certain optical components. This, of course, means that the shared optics are being considered in FIG. 4 on a channel-by-channel basis.

Figure 5:
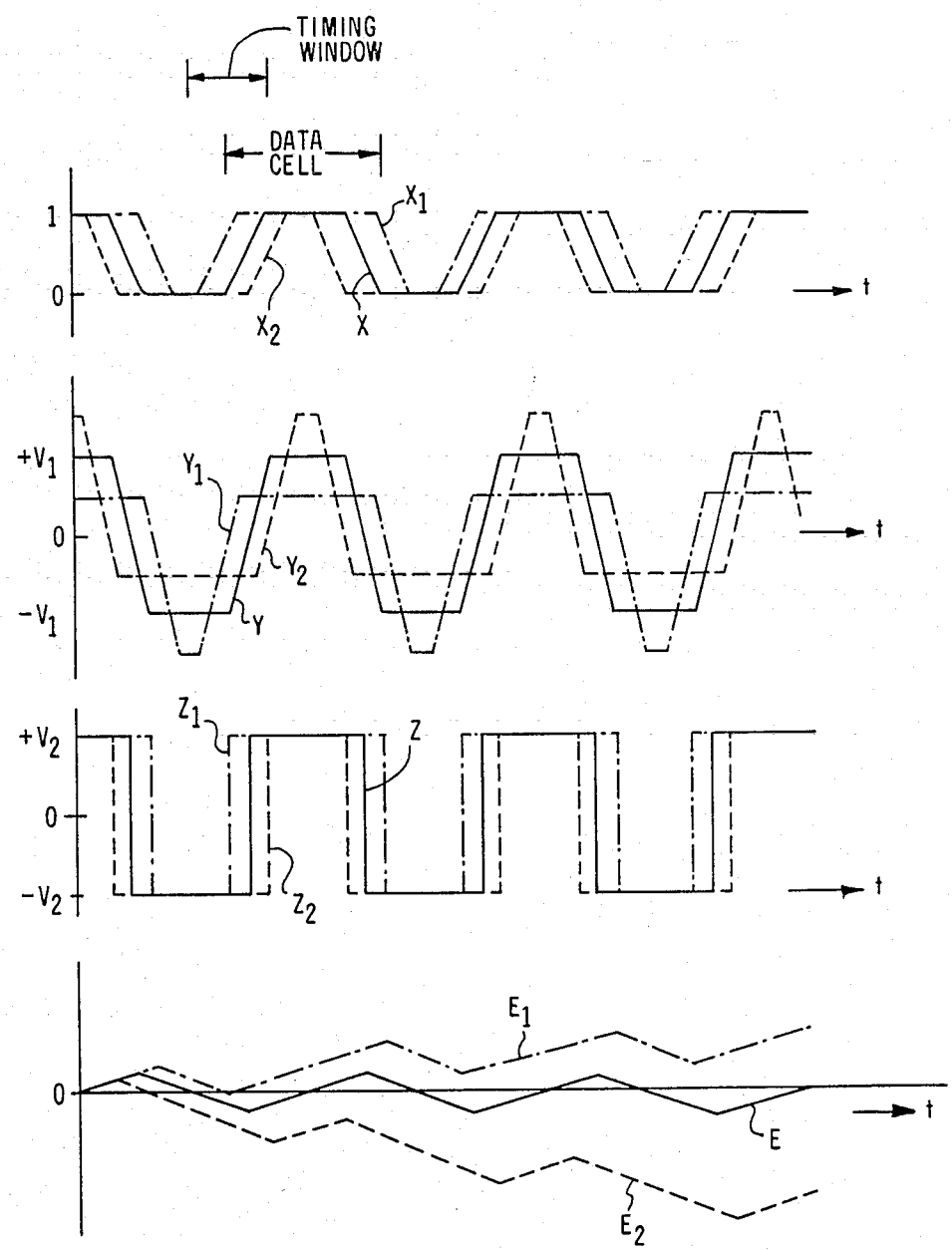
FIG. 5 shows idealized waveforms at various points in the feedback system of FIG. 4 as a function of time and correlates those waveforms with a typical data cell and timing window for the data recording process (the solid lines represent the fully compensated or desired waveforms, the dot-dashed lines represent the appearance of the waveforms when the data is being under-written such that it has an unwanted positive dc component, and the dashed lines represent the appearance of the waveforms when the data is being overwritten such that it has an unwanted negative dc component).

To carry out the present invention, the output of the detector 35 is fed through an ac coupled amplifier 61 to a zero crossing detector 62. Referring to FIGS. 4 and 5, if a dc free code is used, the amplifier 61 provides a bipolar waveform or signal Y. The zero crossing detector 62, in turn, converts the bipolar signal Y into a bipolar pulse train Z which has an average dc level determined by any unwanted dc component the recorded data may exhibit. As shown, the bipolar pulse train Z is then applied to a decoder 63 and to a low pass filter 64. The decoder 63 recovers the original data, while the low pass filter 64 integrates the pulse train Z to provide an error signal E which has a sense and magnitude representative of any unwanted dc component in the recorded data. Of course it may be desireable in practice to design the low pass filter 64 to have a second or higher order filter function so that it can more precisely respond to time varying changes in say, the sensitivity of the recording medium 12, such as might be caused by gradual variations in its substrate thickness. However, such design details are beyond the scope of the present invention. Moreover, it will be appreciated that if a code having a constant, non-zero average dc level is used, provision (not shown) is made to reference the error signal E to that dc level.

While the preamble for an address field 44 or a data field 46 is being written, the error signal E is applied to the current source 51 for the write laser 13 to adjust the intensity of the write beam 14 (FIG. 1) and/or to the delay circuit 50 for the encoder 22 to adjust the timing of the transitions in the encoded data stream. In either case, the adjustment nulls out the unwanted dc component in the recorded data by restoring the proper timing to the recorded data, as indicated at X. As will be appreciated, if the data is recorded with the proper timing, as at X, there is no dc offset in the output signal Z from the zero crossing detector 62.

In operation, the initial stabilizing adjustments to the timing of the recorded data transitions are made while the preamble for the address field 44 or data field 46 of the selected sector 41 (FIG. 3) is being written. Moreover, the proper timing is maintained while the remainder of the field 44 or 46 is being written because the feedback loop continuously restores the desired timing should it tend to drift. To that end, the time constant for the feedback loop is selected to be long relative to the number of data cells required for the code to integrate to a predetermined, fixed dc level so that it does not respond to the ordinary high frequency transitions in the recorded data, but it is still short enough to respond to any lower frequency variations which occur if the timing of those transitions happens to drift. A reasonable design rule is to select the time constant for the feedback loop to be roughly ten times longer than the period over which the code integrates to its predetermined dc level (e.g., zero in the case of a dc free code). For example, the time constant is typically selected to allow the feedback loop to stabilize after detecting approximately 50–100 transitions.

As previously mentioned, the present invention is most readily implemented if a dc free code is employed for encoding the data. In that event, as shown in FIG. 5, the feedback loop is referenced to ground because the nominal dc level for the recorded data is zero. Should the negative going transitions in the recorded data be spaced too closely to the positive going transitions, as indicated at $X_1$, the ac coupled amplifier 61 produces a positively offset signal $Y_1$, thereby causing the zero crossing detector 62 to generate a bipolar pulse train $Z_1$ having a positive average dc voltage level. As a result, the low pass filter 64 provides a positive going error signal $E_1$ to reduce the output power of the write laser 13 and/or to reduce the output duty cycle of the encoder 22. On the other hand, if those transitions are too widely separated, as indicated at $X_2$, the amplifier 61 feeds a negatively offset signal $Y_2$ to the zero crossing detector 62, thereby causing it to generate a bipolar pulse train $Z_2$ having a negative average dc voltage level. Consequently, the low pass filter 64 then provides a negative going error signal $E_2$ to increase the output power of the write laser 13 and/or to increase the output duty cycle of the encoder 22.

CONCLUSION

In view of the foregoing, it will be understood that the present invention provides methods and means for adaptively stabilizing the timing of the recorded data in direct read after write optical memories which use a code having a predetermined average dc content for data recording purposes. While the invention is most readily implemented by using the error signal E to adjust the output current from the current source 20 upwardly or downwardly from a predetermined nominal level so as to increase or decrease, respectively, the intensity of the write beam 14 supplied by the laser 13, it may also be carried out by applying the error signal E to the delay circuit 50 for the encoder 22 so as to increase or decrease the effective duration of the write pulses.

What is claimed is:

1. In a direct read after write optical memory having source means for supplying a write light beam and a read light beam, a detector, optical means for focusing said write and read beams on a recording medium such that said read beam trails immediately behind said write beam and for returning reflected read beam light from said recording medium to said detector, and an encoder coupled to said source means for intensity modulating said write beam in accordance with a code having a predetermined average dc content to record data on said recording medium; an improved feedback means coupled between said detector and said source means for continuously adjusting said write beam to cause said recorded data to have substantially the same average dc content as said code; said feedback means comprising an ac coupled amplifier coupled to said detector, a zero-crossing detector coupled to said amplifier, and a low pass filter coupled to said zero-crossing detector to provide an error signal for adjusting the intensity of said write beam and for isolating said error signal from spurious influences.

2. The improvement of claim 1 wherein said code is a dc free code, and said feedback means holds the average dc content of said recorded data substantially at zero.

3. The improvement of claim 1 further including unidirectional delay means for providing said code with an adjustable timing for transitions in one direction, and wherein said feedback means is coupled to said delay means to control the timing of said transitions, thereby controlling the average dc content of said recorded data.

4. The improvement of claim 3 wherein said code is a dc free code, and said feedback means holds the average dc content of said recorded data substantially at zero.

5. The improvement of claim 4 wherein said feedback means comprises an ac coupled amplifier coupled to said detector, a zero-crossing detector coupled to said amplifier, and a low pass filter coupled to said zero-crossing detector to provide an error signal for adjusting the intensity of said write beam and for isolating said error signal from spurious influences.

6. The improvement of claim 5 wherein said code is a dc free code, and said feedback means holds the average dc content of said recorded data substantially at zero.

* * * * *